United States Patent
Cilento et al.

[15] 3,635,834
[45] Jan. 18, 1972

[54] PROCESS FOR PREPARING SEMISOLID EMULSIONS

[72] Inventors: Rudolfo Cilento, North Brunswick; Robert M. Cohn, Colonia, both of N.J.

[73] Assignee: E. R. Squibb & Sons, Inc., New York, N.Y.

[22] Filed: Dec. 22, 1969

[21] Appl. No.: 886,810

[52] U.S. Cl. ........................ 252/314, 252/309, 252/311, 252/311.5, 252/312, 424/170, 424/172
[51] Int. Cl. ........................................................ B01j 13/00
[58] Field of Search ............... 252/309, 311, 314; 424/170, 424/172

[56] References Cited

UNITED STATES PATENTS

| | | | |
|---|---|---|---|
| 2,254,049 | 8/1941 | Schutte | 252/314 |
| 2,575,874 | 11/1951 | Herlow | 252/314 X |

Primary Examiner—Richard D. Lovering
Attorney—Lawrence S. Levinson, Merle J. Smith, Theodore J. Criares, Donald J. Perrella and Burton Rodney

[57] ABSTRACT

A process is provided for preparing semisolid emulsions (creams) wherein a hot oil phase and a cold aqueous phase are mixed under conditions of high shear to interdisperse and homogenize the phases and with a second thereafter cause them to congeal and form a cream. Emulsifiers are included in either or both of the phases or can be separately mixed with the two phases.

1 Claims, 1 Drawing Figure

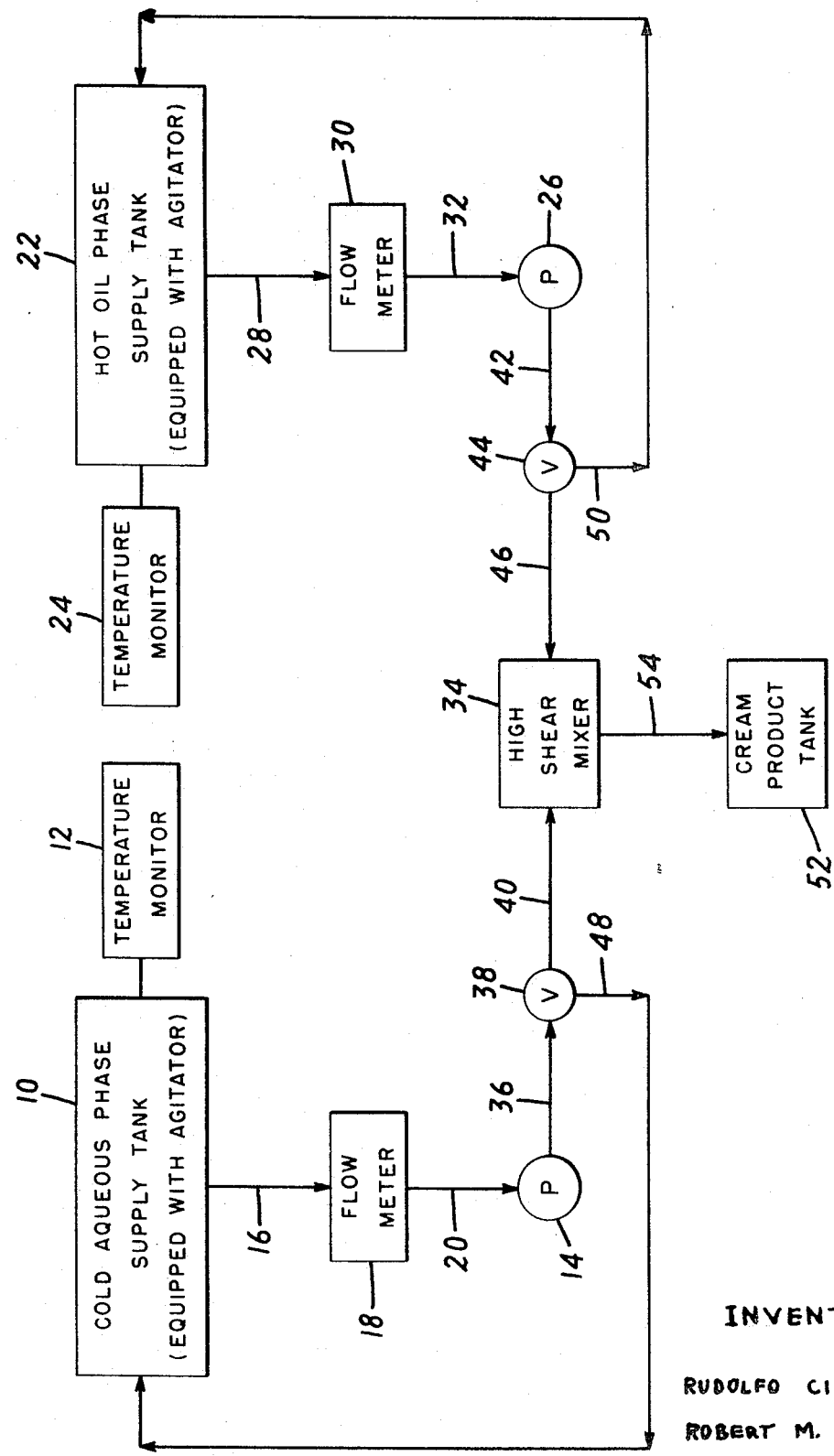

PROCESS FOR PREPARING SEMISOLID EMULSIONS

Creams or cream bases are prepared by a three-step batch operation wherein (1) a hot oil phase and hot water phase are brought together; (2) the two phases are thoroughly mixed to cause the two phases to form a substantially homogeneous mixture; and then (3) the homogeneous mixture is cooled until the mixture congeals and forms a cream.

This procedure has been generally accepted throughout the pharmaceutical industry for preparing cream bases, notwithstanding the fact that it entails three separate operations and the restricted production time and extensive material handling attendant with these operations.

In accordance with the present invention, a process for preparing creams or cream bases is provided which can be carried out continuously and which is substantially more efficient, producing substantially more product and requiring substantially less material handling than prior art three-step operations.

The process of the invention for preparing semisolid emulsions (creams or cream bases) comprises mixing a hot oil phase and a cold aqueous phase under conditions of high shear to interdisperse and homogenize the phases and cause them to congeal.

The creams or cream bases which can be prepared in accordance with the process of the invention are semisolid emulsions of either the oil-in-water or the water-in-oil type. The creams include from about 10 to about 90 percent by weight of an oil phase, from about 90 to about 10 percent by weight of an aqueous phase. The oil phase generally comprises from about 70 to about 90 percent by weight of an oil material such as petrolatum or isopropyl palmitate. Other ingredients which can be present in the oil phase include, for example, emulsifiers, emollients, such as sorbitol, propylene glycol and/or spermaceti or other waxes, perfumes and/or pharmaceuticals.

The aqueous phase generally includes from about 70 to about 90 percent by weight of water and from about 10 to about 30 percent by weight of emulsifiers, emollients, such as described above and/or preservatives. Other ingredients which can be present in the aqueous phase include antifoam agents, pharmaceuticals, perfumes and dyes.

The emulsifier will be included in either or both of the oil or aqueous phases or can be separately mixed with the two phases. Emulsifiers suitable for use herein are those of the anionic, cationic and nonionic types as will be apparent to those skilled in the art.

Other ingredients which can be included in either or both the aqueous phase or oil phase separately or mixed with the two phases include pharmaceutically active agents, film-forming agents, astringents, deodorants, color, perfume, opacifiers, antifoam agents and/or solvents.

In carrying out the continuous process of the invention, a hot oil phase and a cold aqueous phase are fed at controlled flow rates into a zone of high shear, that is, into a high-shear mixer. The flow rates of the two phases can be varied depending upon the temperature of the phases, the shear produced in the mixer and the size of the mixer. However, the flow rates of each of the phases should be controlled so that the congealed material will include the desired proportions of ingredients present in each of the phases. Thus, the flow ratio of the oil phase to the aqueous phase can be within the range of from about 5:1 to about 1:5 and preferably from about 1:1 to about 1:5. The temperature of the oil phase should be from about 10° to about 40° C. and preferably from about 25° to about 35° C. above the congealing point of the two phases and the aqueous phase should be from about 20° to about 5° C. and preferably from about 15° to about 10° C. below the congealing point of the two phases, in order to ensure that the phases will congeal after homogenization occurs and that the congealed product will be substantially homogeneous in composition. Thus, for example, the oil phase can be heated to a temperature within the range from about 60° to about 90° C. preferably from about 75° to 85° C. and the aqueous phase can be at a temperature within the range from about 25° to about 45° C., preferably from about 30° to about 40° C.

Under the above conditions and employing a high-shear mixer, one phase will be finely dispersed in the other phase, that is, the two phases will be homogenized and thereafter will be congealed within a very short period, for example, in less than a second without need for a special cooling operation. However, if desired, the temperature of each of the phases and/or the degree of shear can be adjusted so that the temperature of the homogeneous dispersion of the phases is substantially above (for example, is 1° to 10° C. above) its congelation point. The dispersion can then be cooled to effect congelation and the formation of a cream or cream base.

The zone of high shear can be of any of the high-shear-type mixers known in the art, such as, for example, colloid mills, homomixers or homogenizers, ultrasonic energy mixers, paddle or arm mixers, propeller mixers, including those of the helical type, turbine or centrifugal-impeller mixers or Votators.

The degree of shear required to disperse and homogenize the two phases will depend upon the nature, temperature and flow rates of the phases and is easily arrived at by trial and error as will be apparent to one skilled in the art.

The colloid-type mill is a preferred high-shear mixer in that it imparts a high degree of shear in a very short time so that the two phases can be interdispersed and homogenized before congealing takes place. The two phases are fed between a rapidly revolving solid rotor and its casing, which it clears by 0.001 in. or less. The rotor may or may not be grooved, ant it may or may not be conical. The two phases are subjected to intense shear and intense centrifugal force and the combination acts to make excellent dispersions. In addition, the colloid mill has the advantage of giving continuous flow and therefore is particularly suited for use in the continuous process of the invention.

The degree of shear produced in the colloid mill is controlled by mill speed which on conventional mills can vary between 1,000 and 10,000 r.p.m. and the rotor-stator (or casing) gap which can vary between 2 to 20 mils. It is preferred to employ maximum speed available and about a 6 mil gap.

The attached FIGURE is a schematic drawing of a preferred apparatus setup for carrying out the continuous process of the invention.

In the FIGURE, cold aqueous phase tank 10 equipped with agitator (not shown) and temperature control means 12 is positioned in communication with aqueous phase pump 14 via line 16, flow meter 18 and line 20. Hot oil phase tank 22 equipped with agitator (not shown) and temperature control means 24 is positioned in communication with oil phase pump 26 via line 28, flow meter 30 and line 32. Pumps 14 and 26 are in communication with high-shear mixer 34 via line 36, three-way valve 38, line 40 and via line 42, three-way valve 44, line 46, respectively. Recycle line 48 from valve 38 leads back to aqueous phase tank 10 and recycle line 50 from valve 44 leads back to oil phase tank 22. Cream product tank 52 connects with a mixer 34 via line 54.

The following examples in the opinion of the inventor represents preferred embodiments of his invention:

EXAMPLE 1

Apparatus is assembled as outlined in the FIGURE. The high-shear mixer 34 employed is a Gifford-Wood colloid mill, laboratory model modified to include a rubber stopper clamped down into the hopper of the mill and two steel tubings inserted through openings in the stopper and adapted to receive and convey liquid feed into the mill at a position close to the rotor.

A hot oil phase having the following composition:

| Oil Phase | % by weight |
| --- | --- |
| Glyceryl monostearate NF | 50 |
| Spermaceti U.S.P. | 15 |
| Cetyl alcohol NF | 7.5 |
| Isopropyl palmitate | 7.5 |

| Aqueous phase | % by weight |
| --- | --- |
| Tween 60 (Polyoxyethylene sorbitan stearate) | 20 | is fed to the oil phase tank 22 and is heated to about 80° C.

Water (about one-third of the total present in the ultimate aqueous phase) is charged into the cold aqueous phase supply tank 10 and heated to 80° C. Methyl p-hydroxybenzoate and propyl p-hydroxybenzoate are added to the water and the mixture is mixed until all is dissolved. The balance of water and propylene glycol are added and the mixture is cooled to 35° C. The aqueous phase has the following composition:

| Aqueous phase | % by weight |
| --- | --- |
| Purified water U.S.P. | 95.00 |
| Propylene glycol U.S.P. | 4.78 |
| Methyl p-hydroxybenzoate U.S.P. | 0.20 |
| Propyl p-hydroxybenzoate U.S.P. | 0.02 |

Oil pump 26 is started and is adjusted to pump oil phase from the tank 22 at a flow rate of about 3 kg./min. and valve 44 is set so that the oil phase is recycled via line 50 back to the hot oil phase supply tank 22.

Water pump 14 is started and the flow rate of aqueous phase from tank 10 is adjusted at about 12 kg./min. Valve 38 is set for recycling about 12 kg./min. cold aqueous phase back to the aqueous phase tank 10.

The colloid mill 34 is started and the rotor speed is set at 3,000 r.p.m. and the rotor-stator gap is set at 6 mils. Valves 38 and 44 are then adjusted so that the aqueous phase and the oil phase are simultaneously fed at 3 kg./min. and 12 kg./min., respectively, through the flow meters 18, 30 and pumps 14, 26, respectively, to the colloid mill. The two phases are interdispersed and homogenized in the mill and congealed at 48°–50 C. to a cream base. The congealed product gravity flows out of the mill and is continuously collected in the cream product tank 54.

EXAMPLE 2

In a manner similar to that described in example 1, the following aqueous phase and oil phase are formed into a cream base:

| Aqueous phase | % by weight |
| --- | --- |
| Sorbitol solution U.S.P. | 8.00 |
| Methyl parahydroxy-benzoate U.S.P. | 0.50 |
| Propyl parahydroxy-benzoate U.S.P. | 0.05 |
| Purified water U.S.P. | 91.45 |

| Oil phase | % by weight |
| --- | --- |
| Polyethylene glycol ether complex of high molecular weight fatty alcohols | 40 |
| White petrolatum | 60 |

What is claimed is:

1. A continuous process for preparing a semisolid emulsion of the water-in-oil or oil-in-water type, which comprises passing an oil phase at a temperature within the range of from about 60° to about 90° C. and am aqueous phase at a temperature within the range from about 25° to about 45° C., emulsifier(s) being present in either or both phases or separately mixed with the two phases, the ratio of the flow rate of the oil phase to the flow rate of aqueous phase being within the range of from about 5:1 to about 1:5, through a zone of high shear to interdisperse and homogenize the phases and within a second thereafter cause them to congeal and form a semisolid emulsion.

* * * * *